US012395829B2

(12) United States Patent
Sabeur et al.

(10) Patent No.: US 12,395,829 B2
(45) Date of Patent: Aug. 19, 2025

(54) IMS SLICING BASED ON SLICE IDENTIFIERS FROM HSS

(71) Applicant: T-Mobile USA, Inc., Bellevue, WA (US)

(72) Inventors: Nassereddine Sabeur, Bellevue, WA (US); Saqib Badar, Bellevue, WA (US); Shujaur Rehman Mufti, Snoqualmie, WA (US); Suresh Thanneeru, Redmond, WA (US); Boris Antsev, Bothell, WA (US); Christopher H. Joul, Bellevue, WA (US); Marc A. Proctor, Shanwee, KS (US); Subramania Kaushik, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 349 days.

(21) Appl. No.: 17/897,009

(22) Filed: Aug. 26, 2022

(65) Prior Publication Data

US 2023/0062145 A1   Mar. 2, 2023

Related U.S. Application Data

(60) Provisional application No. 63/238,702, filed on Aug. 30, 2021.

(51) Int. Cl.
*H04W 8/04* (2009.01)
*H04W 24/10* (2009.01)
(Continued)

(52) U.S. Cl.
CPC ............ *H04W 8/04* (2013.01); *H04W 24/10* (2013.01); *H04W 48/18* (2013.01); *H04W 60/00* (2013.01); *H04W 68/00* (2013.01)

(58) Field of Classification Search
CPC ....... H04W 8/04; H04W 24/10; H04W 48/18; H04W 60/00; H04W 68/00; H04W 8/20;
(Continued)

(56) References Cited

U.S. PATENT DOCUMENTS

2009/0253431 A1\* 10/2009 Shi .................... H04L 61/30
                                                           455/435.1
2020/0329075 A1\* 10/2020 Zhang ................ H04L 65/1016
(Continued)

FOREIGN PATENT DOCUMENTS

CN        110572350 A     12/2019
WO     WO2019150245 A1    8/2019
(Continued)

OTHER PUBLICATIONS

Extended European Search Report mailed Jan. 24, 2023 for European Patent Application No. 22192697.5, 13 pages.

*Primary Examiner* — Habte Mered
(74) *Attorney, Agent, or Firm* — Lee & Hayes, P.C.

(57) ABSTRACT

In a telecommunication network, network slices can be identified by slice identifiers used within a core network. The same slice identifiers can also be used by elements of an IP Multimedia Subsystem (IMS) to identify the network slices. For example, a Home Subscriber Server (HSS) can be provisioned with user data associated with a user equipment (UE), including a slice identifier of a network slice that the UE is assigned to use. The HSS can provide the slice identifier to an S-CSCF in the IMS when the UE registers with the IMS. The S-CSCF can share the slice identifier with other IMS elements, such as a P-CSCF and/or one or more application servers. Accordingly, the IMS elements can determine key performance indicators (KPIs) and perform
(Continued)

other operations in association with usage of network slices by UEs, based on the same slice identifiers used within the core network.

17 Claims, 7 Drawing Sheets

(51) Int. Cl.
*H04W 48/18* (2009.01)
*H04W 60/00* (2009.01)
*H04W 68/00* (2009.01)

(58) Field of Classification Search
CPC .. H04W 8/205; H04W 60/04; H04L 41/0806; H04L 43/0876; H04L 41/0895; H04L 41/40; H04L 41/5009; H04L 43/0852; H04L 43/0888; H04L 43/20; H04L 65/1016; H04L 65/1046; H04L 65/1063; H04L 65/1069; H04L 65/1073
See application file for complete search history.

(56) References Cited

U.S. PATENT DOCUMENTS

| | | | |
|---|---|---|---|
| 2020/0413326 A1* | 12/2020 | Stille | H04L 12/1407 |
| 2021/0021647 A1* | 1/2021 | Cai | H04L 45/306 |
| 2021/0036919 A1* | 2/2021 | Foti | H04L 41/0806 |
| 2022/0338152 A1* | 10/2022 | Foti | H04L 65/1016 |

FOREIGN PATENT DOCUMENTS

| | | |
|---|---|---|
| WO | WO2019182493 A1 | 9/2019 |
| WO | WO2021044271 A1 | 3/2021 |

* cited by examiner

US 12,395,829 B2

IMS SLICING BASED ON SLICE IDENTIFIERS FROM HSS

RELATED APPLICATIONS

This U.S. Patent Application claims priority to U.S. Provisional Patent Application No. 63/238,702, entitled "IMS SLICING USING SLICE-ID FROM HSS," filed on Aug. 30, 2021, the entirety of which is incorporated herein by reference.

BACKGROUND

A user equipment (UE), such as a mobile phone, can connect to a telecommunication network to access voice call services, data services, messaging services, and/or other types of services. The telecommunication network can include an Internet Protocol (IP) Multimedia Subsystem (IMS) that can assist with providing such services to UEs.

For example, UEs may connect to a core network of the telecommunication network, such as a fifth generation (5G) core network, for instance via a radio access network (RAN) or other type of access network. The core network may in turn connect the UEs to the IMS. The IMS can include elements that can set up and/or help implement communication sessions for UEs for voice calls, video calls, messaging, data transfers, and/or other services.

Network resources associated with the telecommunication network can also be associated with different network slices. For example, network resources can be allocated among different network slices. Each network slice can thus be used as an independent virtual network, because each network slice may be associated with different network resources. Different network slices may accordingly be created for different sets of subscribers, different types of data, and/or other different uses.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
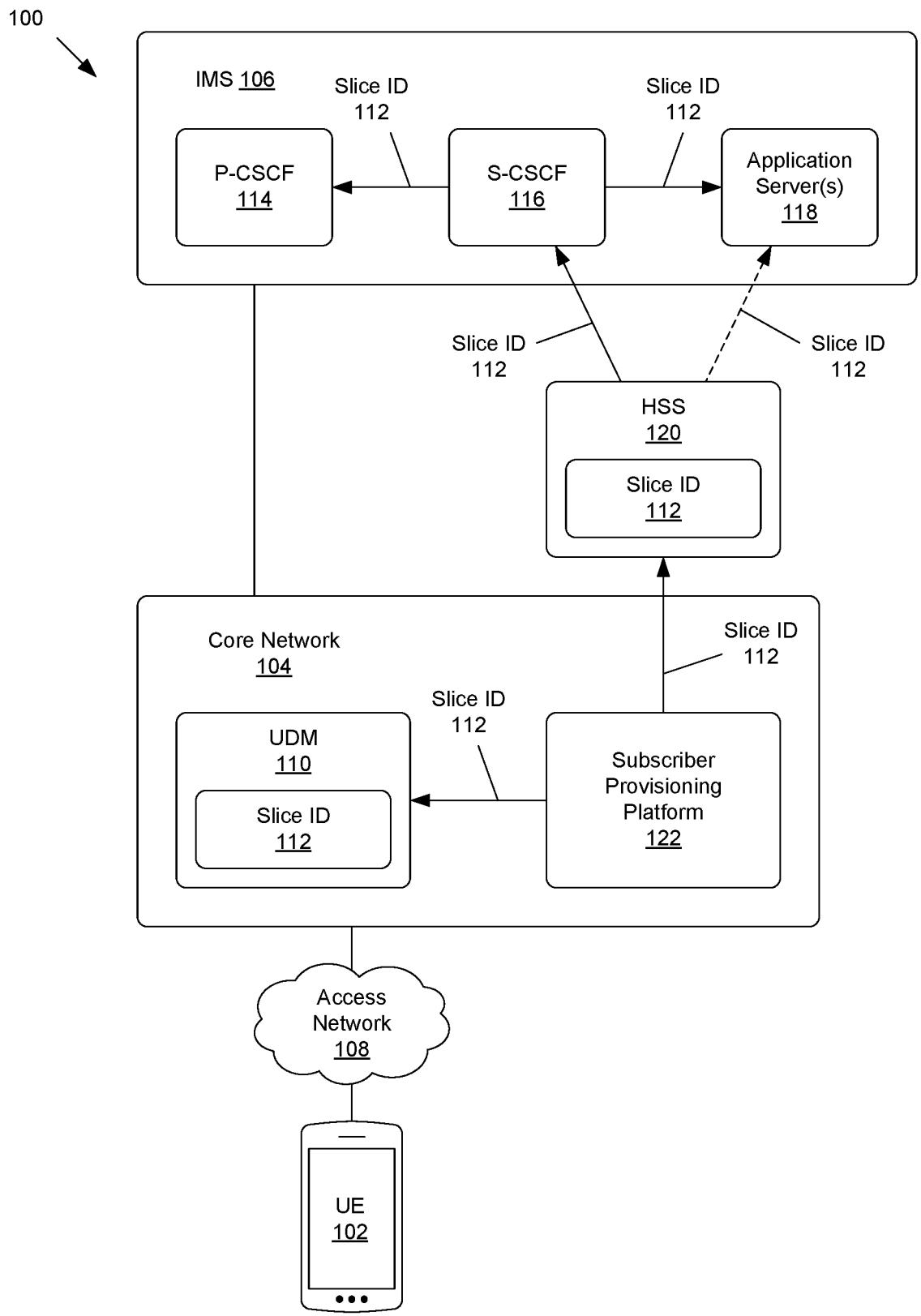
FIG. 1 shows an example of a network environment in which a UE can connect to a telecommunication network.

A telecommunication network can include, or be linked to, an IMS that can set up and/or manage communication sessions for UEs. The IMS can include different types of Call Session Control Functions (CSCFs) that can be configured to perform various operations, such as registering UEs with the IMS and routing messages associated with the UEs. The IMS can also include application servers that can implement services for UEs, such as a telephony application server (TAS) that can provide voice call services for UEs.

The telecommunication network can also include a core network, such as 5G core network. UEs can connect to the core network via RANs or other access networks. The core network can in turn connect the UEs to the IMS, such that the UEs can access services that are implemented in part via the IMS.

Network slicing allows different network slices to be created within the telecommunication network. Each network slice can operate as an independent virtual end-to-end network. For instance, in some examples, different network resources can be allocated to each network slice. An element of the core network can create and/or manage network slices, for example by allocating network resources to different network slices. The different network slices may be associated with different use cases, services, or applications.

As an example, a slice orchestrator or other element of the core network may create and/or manage different network slices for Enhanced Mobile Broadband (eMBB) applications, Massive Internet of Things (MIoT) applications, Ultra-Reliable Low Latency Communication (URLLC) applications, vehicle-to-everything (V2X) applications, and/or other types of applications. In some situations, different network slices can be created for different types of services, such as a first network slice for voice services and a second network slice for data services.

As another example, a core network element may create and/or manage different network slices for different groups of subscribers. For instance, a distinct network slice can be created for customers of a mobile virtual network operator (MVNO), to keep traffic associated with those customers distinct from other traffic within the telecommunication network.

Resources of the core network and/or RANs can be allocated to different network slices as described above. Accordingly, network resources in the core network and/or RANs that have been allocated with different network slices can be used in association with UEs that are assigned to those network slices.

However, in many systems, the IMS may not have information indicating which network slices individual UEs have been assigned to use and/or are allowed to use. Accordingly, the IMS may implement services for UEs that are assigned to any network slice. This may lead to UEs using IMS services via network slices that are intended for other types of services and/or other groups of UEs.

For example, a UE may be assigned by the core network to use a network slice that is associated with low latency traffic. However, if the IMS does not have information indicating that the UE is assigned to the low-latency network slice, the IMS may provide other types of services to the UE that may increase the overall latencies associated with that network slice.

As another example, UEs associated with an MVNO may be assigned by the core network to use a network slice associated with the MVNO. However, if the IMS does not have information indicating which UEs are associated with which network slices, the IMS may implement services for UEs that have been incorrectly assigned to the MVNO network slice.

The systems and methods described herein allow elements of the IMS to identify which network slices UEs are using, based on the same slice identifiers used to identify the network slices in the core network. Accordingly, the IMS elements can determine key performance metrics (KPIs), billing data, and/or other information associated with usage of network slices, based on the same slice identifiers of those networks slices used in the core network. The IMS elements can also use the slice identifiers to verify that UEs are using appropriate network slices. For instance, some IMS elements can be reserved for use with certain network slices in the core network, and the IMS elements can accordingly use slice identifiers associated with UEs to verify that only UEs associated with those network slices are engaged in services via the IMS elements.

Example Environment

FIG. 1 shows an example 100 of a network environment in which a UE 102 can connect to a telecommunication network to engage in communication sessions for voice calls, video calls, messaging, data transfers, and/or any other type of communication. In some examples the UE 102 can be a mobile phone, such as a smart phone or other cellular phone. In other examples, the UE 102 can be a personal digital assistant (PDA), a media player, a tablet computer, a gaming device, a smart watch, a hotspot, an Internet of Things (IoT) device, a personal computer (PC) such as a laptop, desktop, or workstation, or any other type of computing or communication device.

The telecommunication network can include a core network 104 and an IMS 106. The telecommunication network can also include, or be associated with, an access network 108 that the UE 102 can use to connect to the core network 104 and the IMS 106. For example, the access network 108 can be a RAN that includes base stations or other access points to which the UE 102 can wirelessly connect, and which can link the UE 102 to the core network 104. As another example, the UE 102 can connect to the Internet via a Wi-Fi® access point or other type of access point, and use the Internet connection to communicate with the core network 104. The core network 104 can be linked to the IMS 106, such that the UE 102 can connect to the IMS 106 via a connection that extends through the core network 104. The IMS 106 can set up and/or manage communication sessions for UEs, such as communication sessions for voice calls, video calls, messaging, data transfers, and/or other types of services.

The UE 102, the core network 104, the IMS 106, the access network 108, and/or other networks or elements associated with the telecommunication network can be compatible with one or more types of radio access technologies, wireless access technologies, protocols, and/or standards. For example, the UE 102, the core network 104, the IMS 106, and/or the access network 108 can be compatible with fifth generation (5G) New Radio (NR) technology, Long-Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology or wireless access technology.

The core network 104 can be a 5G core network that is based on 5G technology. In some examples, the access network 108 can also be based on 5G technology. For instance, the access network 108 can be a 5G access network that includes one or more 5G base stations knowns as gNBs. The core network 104 can have a service-based system architecture in which different types of network functions can operate alone and/or together to implement services in the core network 104. The network functions of the core network 104 can include a Unified Data Management (UDM) 110, as shown in FIG. 1. The core network 104 can also include other types of network functions in addition to the UDM 110, such as an Authentication Server Function (AUSF), Access and Mobility Management Function (AMF), Network Slice Selection Function (NSSF), Policy Control Function (PCF), Session Management Function (SMF), Unified Data Repository (UDR), User Plane Function (UPF), Application Function (AF), and/or other network functions. Network functions may be implemented in the core network 104 using dedicated hardware, as software on dedicated hardware, or as virtualized functions on servers, cloud computing devices, or other computing devices.

Different network slices can be created in the telecommunication network, so that different network slices can be used by UEs for different use cases, services, or applications. A network slice can be a virtual network that is associated with network resources in the core network 104. In some examples, the network slice can also be associated with network resources in the access network 108 and/or the IMS 106, such that the network slice can be an end-to-end virtual network. For example, shared and/or different resources, such as hardware resources, computing resources, radio resources, and/or other resources of the core network 104, the access network 108, and/or the IMS 106, can be allocated to different network slices. Accordingly, relative to having distinct hardware and/or other network elements for different end-to-end networks, different virtual networks can be created on shared resources via different network slices.

Individual network slices may, in some examples, be associated with service level agreements (SLAs), Quality of Service (QoS) levels or 5G QoS Identifier (5QI) values, or other service-based requirements or goals. For instance, an SLA for a network slice may define types of services to be associated with the network slice, target latency measurements for the network slice, target throughput measurements for the network slice, reliability goals for the network slice, security goals or levels for the network slice, and/or other goals or attributes of the network slice.

As a non-limiting example, a first SLA for a first network slice may indicate that the first network slice is intended for eMBB services. Because eMBB services may often involve relatively large data transmissions, but be delay-tolerant, the first SLA may indicate a relatively high throughput goal for the first network slice, but also allow relatively high latencies on the first network slice. However, in this example, a second SLA for a second network slice may indicate that the second network slice is intended for URLLC services. URLLC services may prioritize low latency measurements and high reliability, and accordingly the second SLA may indicate a relatively low latency goal and a relatively high reliability goal for the second network slice.

In some examples, different network slices may be created for different types or groups of users, such as users associated with different customers, different subscriber levels or tiers, or other categories. As an example, UEs associated with a particular company may be directed to use a private eMBB network slice that has been created for that company's users, while other UEs may be directed to use one or more other eMBB network slices that have been created for general eMBB traffic or for other groups of users. This arrangement may enhance security for the company, as UEs associated with the company may be directed to use the private eMBB network slice created specifically for that company's users, and other UEs may be directed to use one or more other eMBB network slices. Although the different eMBB network slices in this example may each be intended to be used with eMBB services, the different eMBB network slices may be associated with different SLAs that define different throughput goals or other different attributes.

Each network slice can be identified using a corresponding slice identifier 112. The slice identifier 112 for a network slice can be an identifier that is used in the core network 104 to identify the network slice, and/or that is assigned to the network slice by an element of the core network 104. For example, the slice identifier 112 for the network slice can be Single Network Slice Selection Assistance Information (S-NSSAI) associated with the network slice. The S-NSSAI of a network slice may indicate a Slice/Service Type (SST) of the network slice. As an example, the SST of a network slice may indicate that the network slice is intended for eMBB services, URLLC services, MIoT services, voice services, data services, or other types or groups of services. The S-NSSAI may also indicate a Slice Differentiator (SD). For example, if the telecommunication network includes multiple network slices with an "eMBB" SST, each of those multiple eMBB network slices may be distinguished using a different SD value such that each network slice has a different S-NSSAI overall.

As described further below, the slice identifier 112 that is used by the core network 104 to identify a particular network slice can also be provided to elements of the IMS 106. Accordingly, elements of the IMS 106 can identify network slices using the same slice identifiers that are used by elements of the core network 104.

When UEs, such as UE 102, access services through the IMS 106, elements of the IMS 106 can identify which network slices the UEs are using, based on the same slice identifiers used to identify those network slices in the core network 104. Accordingly, the elements of the IMS 106 can determine KPIs, billing data, and/or other types of information associated with usage of different network slices by UEs, based on the slice identifiers of those network slices.

The elements of the IMS 106 can also, or alternately, use the slice identifiers of network slices to determine if UEs are accessing IMS services via appropriate network slices. For instance, if a UE is associated with a slice identifier for a network slice dedicated to voice calls, but the UE is attempting to access IMS services associated with high-speed data transfers, elements of the IMS 106 may deny access to those services because high-speed data transfers may create congestion on the voice call network slice and/or otherwise negatively impact performance of voice call services on the voice call network slice. The elements of the IMS 106 may instead initiate a re-registration or transfer procedure that causes the UE to be reassigned to a different network slice that is dedicated to high-speed data transfers.

In some examples, portions of the infrastructure of the IMS 106, such as particular groups of servers, can be reserved for use with particular network slices. Accordingly, elements of the IMS 106 can similarly use slice identifiers associated with UEs to determine which corresponding portions of the IMS infrastructure can serve the UEs, and/or verify that the UEs are using the portions of the IMS infrastructure that are associated with those slice identifiers.

The elements of the IMS 106 can include Call Session Control Functions (CSCFs) that can operate to register the UE 102 with the IMS 106, manage communication sessions associated with the UE 102, and perform other functions as described further herein. The CSCFs of the IMS 106 can include a Proxy CSCF (P-CSCF) 114 and a Serving CSCF (S-CSCF) 116, as shown in FIG. 1. Although not shown in FIG. 1, the CSCFs can also include an Interrogating CSCF (I-CSCF). The IMS 106 can include multiple instances of the P-CSCF 114, the I-CSCF, and/or the S-CSCF 116. In some examples one or more of the CSCFs may be known by other names, and/or be incorporated into the same or different network elements. For instance, the P-CSCF 114 can be incorporated into, or be referred to as, a Session Border Gateway (SBG), Session Border Controller (SBC), or another network element.

The elements of the IMS 106 can also include one or more application servers 118 that provide services for UEs, such as services for voice calls, video calls, messaging, data transfers, and/or other types of communications or operations. For example, the application servers 118 can include a telephony application server (TAS) that provides or assists with telephony services, such as services for voice and/or video calls. Other types of application servers 118 may implement presence services, messaging services, and/or other types of services.

Elements of the IMS 106 can exchange data with each other and/or the UE 102 using Session Initiation Protocol (SIP) messages. For example, as will be described further below, UEs may initiate a service by sending a SIP request to the IMS 106, and the IMS 106 can return a corresponding SIP response to the UE 102.

Elements of the core network 104 and/or the IMS 106 can communicate with a Home Subscriber Server (HSS) 120. The HSS 120 can include a database of user profile information associated with the UE 102 and other UEs. For example, the HSS 120 can store user profiles for subscribers, location information, and/or other information about users associated with UEs. The HSS 120 can also be involved in authentication and/or authorization of users and/or UEs in the IMS 106. The HSS 120 can communicate with network elements using Diameter protocol interfaces or other types of connections. In some examples, the HSS 120 can be part of the IMS 106. In other examples, the HSS 120 can be outside the IMS 106.

The UDM 110 in the core network 104 can be similar to the HSS 120, and can store user profile information associated with the UE 102 and other UEs. For example, the UDM 110 can manage and/or store data for access authorization, user registration, user profiles, and/or other types of user data that may be used within the core network 104. In some examples, the UDM 110 may be linked to a UDR in the core network 104 that may store the same or similar types of user data. For example, the UDM 110 may provide user data to the UDR and/or determine what types of user data are stored at the UDR.

The HSS 120 may accordingly be configured to store and/or provide user data in association with the IMS 106, while the UDM 110 can be configured to store and/or provide the same or similar user data in association with the core network 104. In some examples the HSS 120 may store and/or provide user data for an LTE core network, and can also store and/or provide the user data to elements of the IMS 106. The UDM 110 can be a 5G counterpart to the HSS 120, such that network functions and other elements of the core network 104 can receive user data from the UDM 110 instead of from the HSS 120.

The core network 104 can have a subscriber provisioning platform 122 that can provide user data to both the UDM 110 and the HSS 120. Accordingly, the subscriber provisioning platform 122 can provide the same or similar user data to both the UDM 110 and the HSS 120, such that elements of the core network 104 can access the user data from the UDM 110 and elements of the IMS 106 can access the user data from the HSS 120. The subscriber provisioning platform 122 may be known by other names, and/or be incorporated into other network functions or network elements. For example, the subscriber provisioning platform 122 can be incorporated into, or be referred to as, a switch controller (SC), a subscriber management function, or another network function or network element.

As described herein, user data associated with the UE 102, provided by the subscriber provisioning platform 122 to both the UDM 110 and the HSS 120, can include the slice identifier 112 that identifies a network slice associated with the UE 102. For example, a set of network slices can be created in the telecommunication network, and each network slice can be associated with a distinct slice identifier. User data for subscribers of the telecommunication network can include slice identifiers of network slices that UEs, associated with the subscribers, are permitted to use. Accordingly, the subscriber provisioning platform 122 can provision both the UDM 110 and the HSS 120 with user data associated with the UE 102, including the slice identifier 112 of a network slice that the UE 102 is permitted to use.

In some examples, the subscriber provisioning platform 122 can include the slice identifier 12 associated with the UE 102 in a "service-info" field of Extensible Markup Language (XML) data provided to the HSS 120 during provisioning of user data associated with the UE 102. The "service-info" field may in some examples be an existing field of the XML data that the subscriber provisioning platform 122 provides to the HSS 120, but the "service-info" field may be otherwise unused or have space for additional data. Accordingly, providing the slice identifier 112 associated with the UE 102 in the "service-info" field can have minimal impact on the provisioning of the HSS 120 with user data. In other example, the subscriber provisioning platform 122 can include the slice identifier 112 associated with the UE 102 to the HSS 120 in a custom field of XML data, or any other field, data element, or type of message.

Elements of the core network 104 can accordingly use the slice identifier 112 associated with the UE 102, stored at the UDM 110, to determine which network slice the UE 102 is using and/or is permitted to use. Similarly, elements of the IMS 106 can use the slice identifier 112 associated with the UE 102, stored at the HSS 120, to determine which network slice the UE 102 is using and/or is permitted to use. Accordingly, elements of the core network 104 and elements of the IMS 106 can use the same slice identifier 112 to identify the same network slice that the UE 102 is using and/or is permitted to use.

Elements of the IMS 106 can receive the slice identifier 112 associated with the UE 102 during an IMS registration process for the UE 102. For example, during the IMS registration process, the HSS 120 can provide the slice identifier 112 associated with the UE 102 to the S-CSCF 116. The S-CSCF 116 can then provide the slice identifier 112 associated with the UE 102 to the P-CSCF 114 and/or to one or more of the application servers 118. The P-CSCF 114, the S-CSCF 116, and/or the application servers 118 can store the slice identifier 112 associated with the UE 102 in a cache or other data repository. In some examples, the application servers 118 can also, or alternately, obtain the slice identifier 112 associated with the UE 102 from the HSS 120 directly. For instance, an application server 118 can retrieve the slice identifier 112 from the HSS 120 if the application server 118 did not receive the slice identifier 112 from the S-CSCF 116 during the IMS registration process, or if the application server 118 is configured to use the slice identifier 112 received directly from the HSS 120 to verify the slice identifier 112 received from the S-CSCF 116 during the IMS registration process. Examples of elements of the IMS 106 receiving the slice identifier 112 during the IMS registration process is discussed further below with respect to FIG. 2 and FIG. 5.

After elements of the IMS 106 have received the slice identifier 112 associated with the UE 102, the elements of the IMS 106 can use the slice identifier 112 to determine which network slice the UE 102 is using to exchange data with the IMS 106. For example, when the P-CSCF 114 receives a SIP message from the UE 102, the P-CSCF 114 can retrieve the slice identifier 112 associated with the UE 102 from a cache or other data repository maintained by the P-CSCF 114. The P-CSCF 114 can insert the slice identifier 112 associated with the UE 102 into the SIP message, and then forward the SIP message on to the S-CSCF 116 and/or an application server 118. Accordingly, the S-CSCF 116, the application server 118, and/or other elements of the IMS 106 can use the slice identifier 112 associated with the UE 102, inserted into the SIP message by the P-CSCF 114, to determine which network slice the UE 102 is using to communicate with the IMS 106. In some examples, elements of the IMS 106 can similarly include or insert the slice identifier 112 associated with the UE 102 into SIP messages being exchanged between the elements of the IMS 106 and/or being sent back to the UE 102. Examples of the slice identifier 112 associated with the UE 102 being inserted into SIP messages are discussed further below with respect to FIG. 3 and FIG. 6.

One or more elements of the IMS 106 can be configured to use the slice identifier 112 associated with the UE 102 to verify that the UE 102 is permitted to use services of the IMS 106 via the corresponding network slice. One or more elements of the IMS 106 can also be configured to use the slice identifier 112 associated with the UE 102 to determine KPIs, billing data, or other information associated with usage of the corresponding network slice.

As an example, a TAS of the IMS 106 that implements voice call services may be configured to verify that the slice identifier 112 associated with the UE 102 indicates that the UE 102 is using a network slice that has been set up in the core network 104 for voice services. The TAS may determine the slice identifier 112 associated with the UE 102 based on the slice identifier being inserted into a SIP message by the P-CSCF 114, from a cache of the TAS that stores the slice identifier 112 based on a previous IMS registration process, and/or by requesting the slice identifier 112 directly from the HSS 120. The TAS may implement requested voice call services for the UE 102 if the slice identifier 112 associated with the UE 102 matches the slice identifier 112 used in the core network 104 for a network slice associated with voice call services. If the slice identifier 112 associated with the UE 102 does not match the slice identifier 112 used in the core network 104 for a network slice associated with voice call services, the TAS may deny the voice call services, and/or instruct the P-CSCF 114 or other network elements to initiate a re-registration procedure that can assign the UE 102 on the network slice associated with voice call services.

As another example, if the P-CSCF 114 receives a SIP request from the UE 102, the P-CSCF 114 can retrieve the slice identifier 112 associated with the UE 102 from a cache or other data store. The P-CSCF 114 can determine that the slice identifier 112 corresponds with a particular network slice, and can verify that the S-CSCF 116 and/or an application server 118 to which the SIP request will be forwarded are also associated with that particular network slice. If the S-CSCF 116 and/or the application server 118 are associated with a different network slice, for instance if the S-CSCF 116 and/or the application server 118 are reserved for use by UEs associated with a different network slice, the P-CSCF 114 may cause the UE 102 to re-register with the IMS 106 such that the UE 102 becomes re-assigned to different instances of the S-CSCF 116 and/or the application server 118 that are associated with the network slice that corresponds to the slice identifier 112.

As yet another example, the P-CSCF 114, the S-CSCF 116, and/or the application servers 118 can track usage of IMS services by the UE 102 and other UEs based on the slice identifiers associated with those UEs. For example, if the slice identifier 112 associated with the UE 102 corresponds with a particular network slice that has been set up in the core network, the P-CSCF 114, the S-CSCF 116, and/or the application servers 118 can use the slice identifier 112 to determine when the UE 102 uses that particular network slice to engage in services via the IMS 106, track a number of times the UE 102 uses the particular network slice to engage in instances of the services, and/or otherwise track usage of the particular network slice by the UE 102.

The P-CSCF 114, the S-CSCF 116, and/or the application servers 118 can similarly use slice identifiers associated with different UEs to track usage of IMS services by the UEs via one or more network slices. Accordingly, the P-CSCF 114, the S-CSCF 116, and/or the application servers 118 can determine KPIs associated with network slices identified by corresponding slice identifiers, such as KPIs indicating how often particular network slices are used to engage in communication sessions or other IMS services, which types of communication sessions or other IMS services are being used via particular network slices, total numbers of instances of communication sessions or other IMS services that UEs are engaging in over periods of time, how usage of network slices for communication sessions or other IMS services compares to total capacities of the network slices, latency metrics associated with communication sessions or IMS services that UEs are engaging in via the network slices, throughput metrics associated with communication sessions or IMS services that UEs are engaging in via the network slices, and/or other types of KPIs.

In some examples, an IMS element, such as the P-CSCF 114, the S-CSCF 116, or the application server 118, can compare KPIs associated with particular network slices against corresponding SLAs for the network slices. For instance, if an SLA for a network slice indicates a particular latency goal for traffic associated with the network slice, the IMS element may compare latency KPIs determined for the network slice against the latency goal defined in the SLA to determine whether the traffic associated with the network slice in the IMS 106 is meeting the latency goal.

The P-CSCF 114, the S-CSCF 116, and/or the application servers 118 can also use slice identifiers associated with UEs to determine billing data associated with usage of corresponding network slices. For example, a TAS may use slice identifiers associated with UEs to determine that, over a period of time, UEs have made 10,000 calls via a network slice that has been set up in the core network 104 to handle traffic associated with an MVNO. Accordingly, the TAS or another network element can determine billing data indicating that the MVNO should be charged an amount corresponding to 10,000 calls having been made via that network slice.

In some examples, IMS elements, such as the P-CSCF 114, the S-CSCF 116, and/or the application servers 118, may also be configured to prioritize operations associated with one or more network slices over one or more other network slices, based on corresponding slice identifiers. Accordingly, if a first UE is associated with a higher-priority network slice than a second UE, an IMS element may use slice identifiers associated with the first UE and the second UE to determine that the IMS should prioritize routing traffic and/or performing other operations associated with the first UE and the higher-priority network slice over routing traffic and/or performing other operations associated with the second UE and the lower-priority network slice.

Additional examples of a network element associated with the IMS 106 using slice identifiers associated with UEs to identify the network slices being used by the UEs to access the IMS 106, to determine KPIs and/or billing data associated with network slices, and/or for other operations are discussed further below with respect to FIG. 7. Because the elements of the IMS 106 can use the same slice identifier 112 to identify each network slices as elements of the core network 104, information such as KPIs and/or billing data associated with particular network slices determined by elements of the IMS 106 can be used to determine and/or evaluate usage of those network slices in the core network 104.

Figure 2:
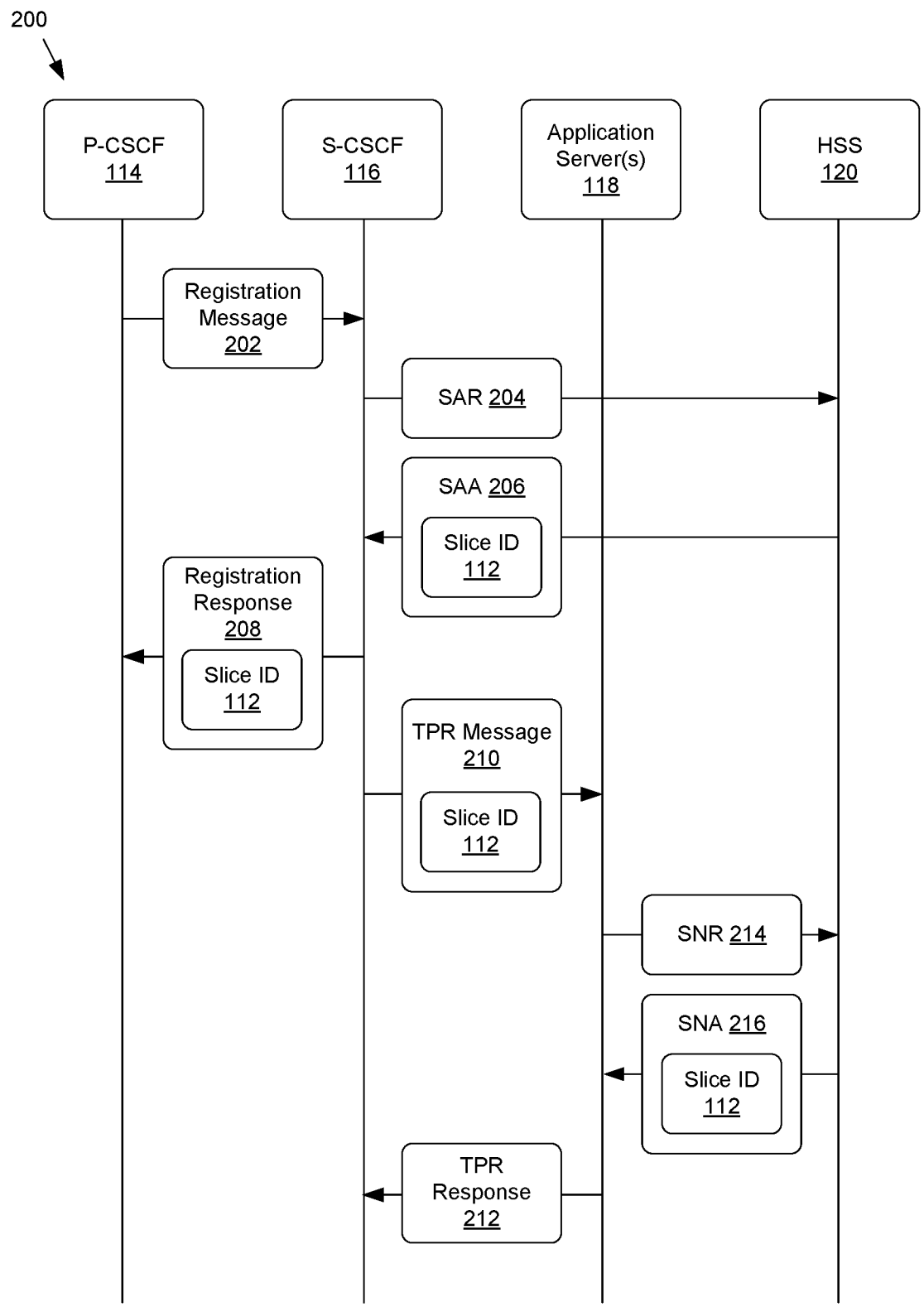
FIG. 2 shows an example of a sequence of messages that can be exchanged between elements of the IMS during an IMS registration process for the UE.

FIG. 2 shows an example 200 of a sequence of messages that can be exchanged between elements of the IMS 106 during an IMS registration process for the UE 102. The sequence of messages shown in FIG. 2 can provide the IMS elements, including the P-CSCF 114, the S-CSCF 116, and one or more application servers 118 with the slice identifier 112 associated with the UE 102. As described above, the slice identifier 112 associated with the UE 102 can identify a corresponding network slice that the UE 102 is using and/or is allowed to use. The slice identifier 112 provided to the IMS elements during the IMS registration process as shown in FIG. 2 can also be the same as the slice identifier 112 used to identify the network slice within the core network 104, such as an S-NSSAI.

When the UE 102 attaches to the telecommunication network or otherwise initiates communication with the IMS 106, an IMS registration process can occur. During the IMS registration process, the UE 102 can send a registration message 202 to the P-CSCF 114. For example, the registration message 202 can be a SIP REGISTER message. The registration message 202 may indicate one or more identifiers of the UE 102, such as a Mobile Station International Subscriber Directory Number (MSISDN), International Mobile Subscriber Identity (IMSI), and/or other identifiers. The P-CSCF 114 can forward the registration message 202 to the S-CSCF 116 as shown in FIG. 2, for instance after an I-CSCF has assigned the UE 102 to the S-CSCF 116.

The S-CSCF 116 can serve as a registrar for the IMS 106, and can authenticate the UE 102 and complete registration of the UE 102 with the IMS 106 in association with the HSS 120. For example, the S-CSCF 116 can send a Server Assignment Request (SAR) 204 associated with the UE 102 to the HSS 120. The SAR 204 can include one or more identifiers of the UE 102, such as a MSISDN, IMSI, and/or identifiers. The SAR 204 can also request user data, such as subscriber information, associated with the identified UE 102. The HSS 120, having been provisioned by the subscriber provisioning platform 122 with the slice identifier 112 that is associated with the UE 102, can return to the S-CSCF 116 a Server Assignment Answer (SAA) 206 that includes the slice identifier 112 associated with the UE 102. The SAA 206 can also include other types of user data associated with the UE 102. In some examples, the HSS 120 can include the slice identifier 112 associated with the UE 102 in a "service-info" field, custom field, or other field of XML data associated with the SAA 206. In other examples, the HSS 120 can include the slice identifier 112 in any other field or data element of the SAA 206.

The S-CSCF 116 can include the slice identifier 112, received from the HSS 120 in the SAA 206, in a registration response 208 that the S-CSCF 116 sends to the P-CSCF 114. In some examples, the registration response 208 can be a "200 OK" message that the S-CSCF 116 sends to the P-CSCF 114 after processing the registration message 202, and the S-CSCF 116 can include the slice identifier 112 in a private header, or other data field, of the "200 OK" message. In other examples, S-CSCF 114 can send the slice identifier 112 to the P-CSCF 114 in a different type of message, such as a different type of registration response 208 or a separate message sent in addition to the registration response 208. After receiving the slice identifier 112 associated with the UE 102 from the S-CSCF 116, the P-CSCF 114 can cache the slice identifier 112 associated with the UE 102 for future use, for example as discussed further below with respect to FIG. 3. For instance, the P-CSCF 114 can cache the slice identifier 112 included in the registration response 208 in a database, in association with the MSISDN, IMSI, and/or other identifiers of the UE 102.

In some examples, the S-CSCF 116 can also select one or more application servers 118 for the UE 102, which can implement services for the UE 102 as described above. The S-CSCF 116 can provide the slice identifier 112 associated with the UE 102 to the selected application servers 118. For example, the S-CSCF 116 can include the slice identifier 112 in a Third Party Registration (TPR) message 210 that the S-CSCF 116 sends to a selected application server 118 in association with the UE 102. In some examples, the S-CSCF 116 can include the slice identifier 112 associated with the UE 102 in a "service-info" field, custom field, or other field of XML data associated with the TPR message 210. In other examples, the HSS 120 can include the slice identifier 112 in any other field or data element of the TPR message 210. The TPR message 210 can also indicate one or more identifiers of the UE 102, such as a MSISDN, IMSI, and/or identifiers. The application server can return to the S-CSCF 116 a Third Party Registration (TPR) response 212 that confirms receipt of the TPR message 210.

An application server 118 may, in some examples, also or alternately obtain the slice identifier 112 associated with the UE 102 from the HSS 120. For example, the application server 118 can send a Subscribe Notifications Request (SNR) 214 associated with the UE 102 to the HSS 120. The SNR 214 can indicate one or more identifiers of the UE 102, such as a MSISDN, IMSI, and/or identifiers. The HSS 120 can return to application server 118 a Subscribe Notifications Answer (SNA) 216 that includes the slice identifier 112 associated with the UE 102. In some examples, the HSS 120 can include the slice identifier 112 associated with the UE 102 in a "service-info" field, custom field, or other field of XML data associated with the SNA 216. In other examples, the HSS 120 can include the slice identifier 112 in any other field or data element of the SNA 216.

In some examples, the application server 118 can send the SNR 214 after receiving the TPR message 210 from the S-CSCF 116 that includes the slice identifier 112, so that the application server 118 can verify that the slice identifier 112 received from the S-CSCF 116 matches the slice identifier 112 provided by the HSS 120 in the SNA 216. The application server 118 may, in some examples, wait to send the TPR response 212 to the S-CSCF 116 until the application server 118 receives the SNA 216 from the HSS 120. In other examples, the application server 118 may be configured to not obtain the slice identifier 112 from the HSS 120, and may be configured to use the slice identifier 112 received in the TPR message 210 from the S-CSCF 116 without verifying the slice identifier 112 with the HSS 120.

In still other examples, if the application server 118 does not receive the slice identifier 112 associated with the UE 102 from the S-CSCF 116 during IMS registration of the UE 102, the application server 118 can use the SNR 214 to obtain the slice identifier 112 from the HSS 120 during or after the IMS registration process for the UE 102. For example, if the application server 118 does not receive the slice identifier 112 associated with the UE 102 during the IMS registration process, and the application server 118 later receives a SIP message that includes the slice identifier 112 associated with the UE 102 as discussed further below with respect to FIG. 3, the application server 118 may send the SNR 214 to the HSS 120 so that the application server 118 can receive the slice identifier 112 in the SNA 216 and verify that the slice identifier 112 is associated with the UE 102.

After receiving the slice identifier associated with the UE 102, from the S-CSCF 116 and/or from the HSS 120, the application server 118 can cache the slice identifier 112 associated with the UE 102 for future use, for example as discussed further below. For instance, the application server 118 can cache the slice identifier 112 included in the TPR message 210 and/or the SNA 216 in a database, in association with the MSISDN, IMSI, and/or other identifiers of the UE 102.

Figure 3:
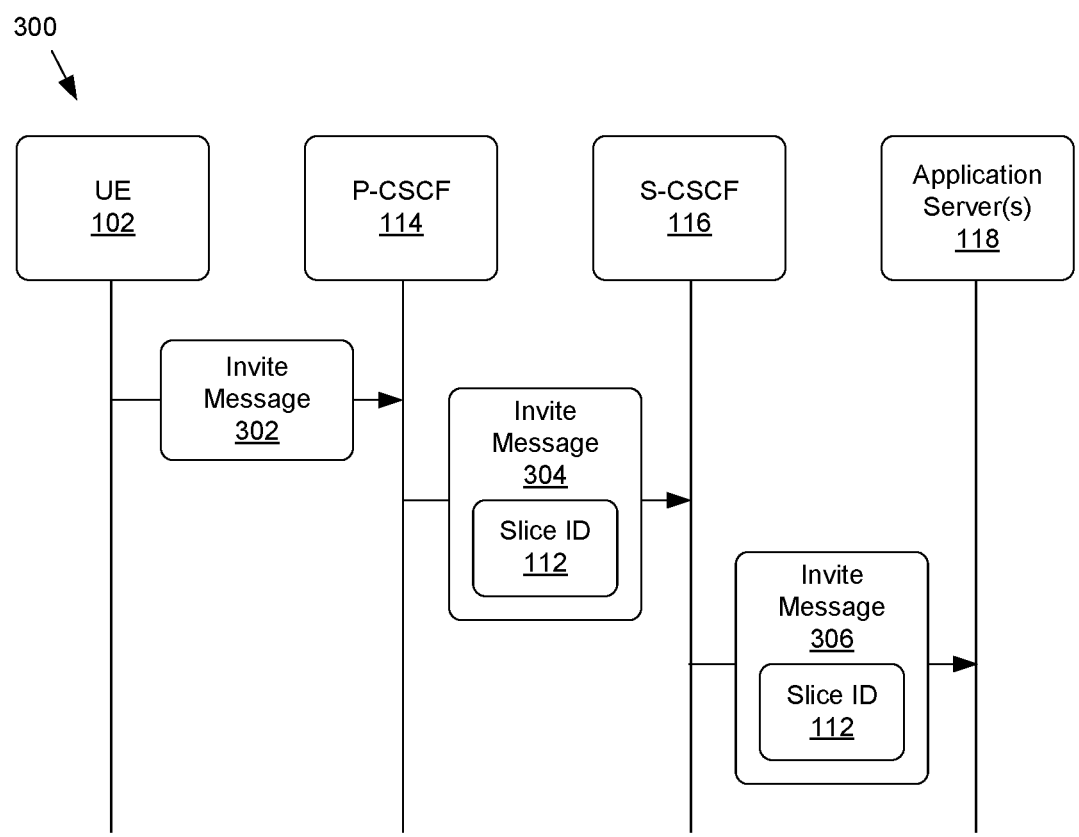
FIG. 3 shows an example of a sequence of messages that can be exchanged between elements of the IMS after the IMS registration process for the UE.

FIG. 3 shows an example 300 of a sequence of messages that can be exchanged between elements of the IMS 106 after an IMS registration process for the UE 102. The messages exchanged between the elements of the IMS 106 in FIG. 3 can include the slice identifier 112 associated with the UE 102. Accordingly, the IMS elements, such as the P-CSCF 114, the S-CSCF 116, and one or more application servers 118, can use the slice identifier 112 to identify the network slice that the UE 102 is using to access the IMS 106. The slice identifier 112 included in the messages shown in FIG. 3 can also be the same as the slice identifier 112 used to identify the network slice within the core network 104, such as an S-NSSAI.

After the UE 102 has registered with the IMS 106, for instance via the process shown in FIG. 2, the UE 102 can engage in services via the IMS 106. For example, to engage in a voice call via the IMS 106, the UE 102 can send an invite message 302 to the P-CSCF 114. The invite message 302 can, for example, be a SIP INVITE message. The invite message 302 may indicate one or more identifiers of the UE 102, such as an MSISDN, IMSI, and/or other identifiers.

As described above with respect to FIG. 2, the P-CSCF 114 can have previously received the slice identifier 112 associated with the UE 102 from the S-CSCF 116 during the IMS registration process, and can have cached the slice identifier 112 associated with the UE 102. For instance, the P-CSCF 114 can have cached the slice identifier 112 in association with the MSISDN, IMSI, and/or other identifiers of the UE 102. Accordingly, the P-CSCF 114 can retrieve the cached slice identifier 112 associated with the UE 102, for instance based on the MSISDN, IMSI, and/or other identifiers of the UE 102 indicated by the invite message 302.

Based on retrieving the slice identifier 112 associated with the UE 102 from a cache, the P-CSCF 114 can insert the slice identifier 112 associated with the UE 102 into the invite message 302. For example, the P-CSCF 114 can insert the slice identifier 112 into a "service-info" field, custom field, or other field of XML data of the invite message 302. In other examples, the P-CSCF 114 can insert the slice identifier 112 into any other field or data element of the invite message 302. After inserting the slice identifier 112 into the invite message 302, the P-CSCF 114 can send the invite message 302 on to the S-CSCF 116 assigned to the UE 102. The S-CSCF 116 can in turn send the invite message 302 to one of the application servers 118, such as a TAS, that has been selected to implement voice call services for the UE 102. Accordingly, the application server can perform operations that allow the UE 102 to participate in the voice call.

As described herein, because the P-CSCF 114 inserts the slice identifier 112 associated with the UE 102 into the invite message 302, the S-CSCF 116 and/or the application servers 118 can use the slice identifier 112 to determine which network slice the UE 102 is using. In some examples, the S-CSCF 116 or an application server 118 can compare the slice identifier 112 inserted into the invite message 302 against the slice identifier 112 previously-cached by the S-CSCF 116 or an application server 118 in association with the UE 102, and/or retrieve the slice identifier 112 associated with the UE 102 from the HSS 120 as described above, to verify that the UE 102 is using the correct network slice.

Because slice identifiers can be inserted, by the P-CSCF 114, into invite messages that the S-CSCF 116 and/or the application servers 118 receive, the P-CSCF 114, the S-CSCF 116, and/or the application servers 118 can determine how many of the invite messages are associated with corresponding network slices, how often invite messages are associated with corresponding network slices, and/or other types of KPIs associated with the corresponding network slices. For instance, if a TAS receives 1000 invite messages, and 400 of the invite messages include a first slice identifier of a first network slice while 600 of the invite messages include a second slice identifier of a second network slice, the TAS can determine that 40% of the calls associated with that set of 1000 invite messages are being made via the first network slice and that the other 60% of the calls associated with that set of 1000 invite messages are being made via the second network slice.

In other examples, other types of messages exchanged within the IMS 106 can include the slice identifier. For example, if a TAS receives SIP INVITE messages associated with call initiation requests from originating UEs, the TAS can send responsive SIP messages back towards the UEs, such as "180 Ringing" messages indicating that terminating UEs are ringing to alert users of the calls, "200 OK" messages indicating that terminating UEs have answered the calls, "BYE" messages indicating that UEs have terminated calls, and/or other types of messages. Accordingly, based on a cache of slice identifiers associated with the originating UEs, the TAS can insert the slice identifiers into such SIP messages to indicate to the S-CSCF 116 and the P-CSCF 114 when calls associated with corresponding network slices are ringing, answered, terminated, or are associate with other events. Accordingly, elements of the IMS 106 can determine KPIs such as how often calls associated with certain network slices are answered, how long such calls take to be answered, how long such calls take before being terminated, and/or other KPIs.

Example Architecture

Figure 4:
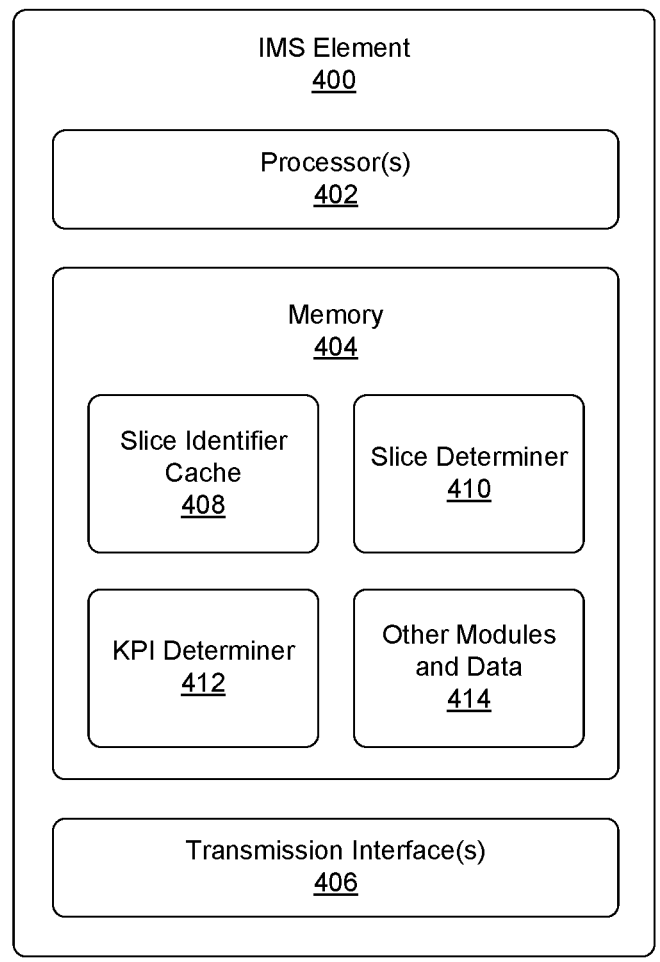
FIG. 4 shows an example system architecture for an IMS element that is configured to use slice identifiers to determine which network slices UEs connected to the IMS are using.

FIG. 4 shows an example system architecture for an IMS element 400 that is configured to use slice identifiers to determine which network slices UEs connected to the IMS 106 are using. The IMS element 400 can be an element of the IMS 106, such as the P-CSCF 114, the S-CSCF 116, and/or an application server 118 discussed above. As shown, the IMS element 400 can include processor(s) 402, memory 404, and transmission interface(s) 406. In some examples, the IMS element 400 can be distinct hardware for the P-CSCF 114, the S-CSCF 116, and/or one or more application servers 118. However, in other examples, the IMS element 400 can be one or more servers, computing systems, or other computing devices that execute the P-CSCF 114, the S-CSCF 116, and/or the application servers 118 as software applications or that executes one or more virtual instances of the P-CSCF 114, the S-CSCF 116, and/or the application servers 118.

In various examples, the processor(s) 402 can be a central processing unit (CPU), a graphics processing unit (GPU), both CPU and GPU, or any other type of processing unit. Each of the one or more processor(s) 402 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 402 may also be responsible for executing all computer-executable instructions and/or computer applications stored in the memory 404.

In various examples, the memory 404 can include system memory, which may be volatile (such as RAM), non-volatile (such as ROM, flash memory, etc.) or some combination of the two. The memory 404 can also include additional data storage devices (removable and/or non-removable) such as, for example, magnetic disks, optical disks, or tape. Memory 404 can further include non-transitory computer-readable media, such as volatile and nonvolatile, removable and non-removable media implemented in any method or technology for storage of information, such as computer-readable instructions, data structures, program modules, or other data. For example, the memory 404 can store software or firmware elements, such as computer-readable instructions that are executable by the one or more processors 402. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other non-transitory medium which can be used to store desired information and which can be accessed by the IMS element 400. Any such non-transitory computer-readable media may be part of the IMS element 400.

The memory 404 can store computer-readable instructions and/or other data associated with operations of the IMS element 400, including operations associated with determining and using slice identifiers associated with UEs. As an example, the memory 404 can store a slice identifier cache 408 that indicates the slice identifiers associated with UEs. The slice identifier cache 408 can indicate slice identifiers associated with UEs, for instance in association with MSISDNs, IMSIs, and/or other identifiers of the UEs, based on data received by the IMS element 400 from the HSS 120 and/or the S-CSCF 116 as described above. The memory 404 can also include data associated with a slice determiner 410 that is configured to determine, based on a slice identifier associated with a UE, which network slice a UE is using and/or is permitted to use. The memory 404 can also include data associated with a KPI determiner 412 that is configured to determine, in association with one or more network slices that correspond to slice identifiers, one or more types of KPIs and/or billing data associated with the corresponding network slices. The memory 404 can also store other modules and data 414, which can be utilized by the IMS element 400 to perform or enable performing any action taken by the IMS element 400. The other modules and data 414 can include a platform, operating system, firmware, and/or applications, and data utilized by the platform, operating system, firmware, and/or applications.

The transmission interface(s) 406 can include one or more modems, receivers, transmitters, antennas, error correction units, symbol coders and decoders, processors, chips, application specific integrated circuits (ASICs), programmable circuit (e.g., field programmable gate arrays), firmware components, software components, and/or other components through which the IMS element 400 can send data to, and/or receive data from, other IMS elements, other network elements, network functions of the core network 104, UEs, and/or other elements. For example, if the IMS element 400 is the P-CSCF 114, the P-CSCF 114 can use one or more transmission interfaces 406 to exchange data with the elements of the core network 104, the UE 102, the S-CSCF 116, and/or other elements. As another example, if the IMS element 400 is the S-CSCF 116, the S-CSCF 116 can use one or more transmission interfaces 406 to exchange data with the P-CSCF 114, the application servers 118, the HSS 120, and/or other elements. As still another example, if the IMS element 400 is an application server 118, the application server 118 can use one or more transmission interfaces 406 to exchange data with the S-CSCF 116, the HSS 120, and/or other elements.

Example Operations

Figure 5:
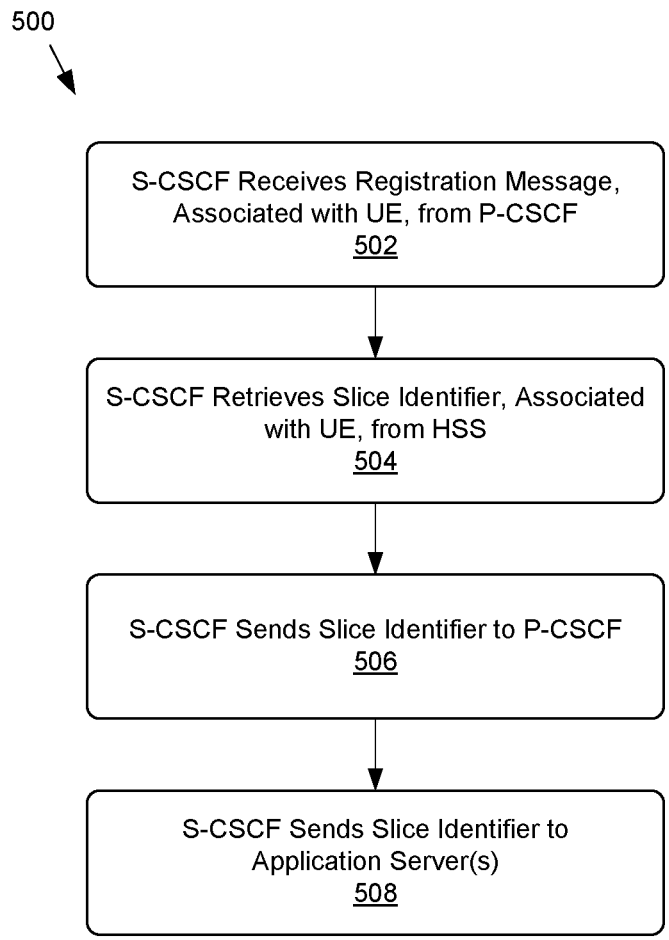
FIG. 5 shows a flowchart of an example method by which a S-CSCF can provide a slice identifier associated with the UE to a P-CSCF and/or one or more application servers during an IMS registration process for the UE.

FIG. 5 shows a flowchart of an example method 500 by which the S-CSCF 116 can provide the slice identifier 112 associated with the UE 102 to the P-CSCF 114 and/or one or more application servers 118 during an IMS registration process for the UE 102. The IMS registration process can be initiated when the UE 102 sends the registration message 202 to the P-CSCF 114, as discussed above with respect to FIG. 2.

At block 502, the S-CSCF 116 can receive the registration message 202 from the P-CSCF 114. For example, after the P-CSCF 114 receives the registration message 202 from the UE 102, the P-CSCF 114 can request that an I-CSCF assign the UE 102 to an S-CSCF, and the P-CSCF 114 can forward the registration message 202 to the S-CSCF 116 selected for the UE 102 by the I-CSCF.

At block 504, the S-CSCF 116 can retrieve the slice identifier 112 that is associated with the UE 102 from the HSS 120. For example, the S-CSCF 116 can send the SAR 204 to the HSS 120 to request user data associated with the UE 102. Because the subscriber provisioning platform 122 can have provisioned both the UDM 110 and the HSS 120 with the slice identifier 112 that is associated with the UE 102, the HSS 120 can include the slice identifier 112 in the SAA 206 that the HSS 120 returns to the S-CSCF 116. In some examples, the slice identifier 112 can be included by the HSS 120 in a "service-info" field, custom field, or other field of XML data associated with the SAA 206.

At block 506, the S-CSCF 116 can send the slice identifier 112, obtained by the S-CSCF 116 at block 504, to the P-CSCF 114. For example, the S-CSCF 116 can include the slice identifier 112 in the registration response 208 that the S-CSCF 116 sends to the P-CSCF 114 in response to the registration message received at block 502. The registration response 208 can, for example, be a "200 OK" message that the S-CSCF 116 sends to the P-CSCF 114, and the S-CSCF 116 can include the slice identifier 112 in a private header or other data field of the "200 OK" message. The P-CSCF 114 can accordingly cache the slice identifier 112 associated with the UE 102 for future use.

At block 508, the S-CSCF 116 can also send the slice identifier 112, obtained by the S-CSCF 116 at block 506, to one or more application servers 118. For example, the S-CSCF 116 can include the slice identifier 112 in the TPR message 210 that the S-CSCF 116 sends to an application server 118, for instance in a "service-info" field, custom field, or other field of XML data associated with the TPR message 210, or any other type of field or data element of the TPR message 210. The application server 118 can accordingly cache the slice identifier 112 associated with the UE 102 for future use, and/or verify the slice identifier 112 by also obtaining the slice identifier 112 from the HSS 120 directly via the SNR 214 and SNA 216. In some examples, the S-CSCF 116 may omit sending the slice identifier 112 to an application server 118 at block 508. However, in these examples, the application server 118 can separately obtain the slice identifier 112 from the HSS 120 via the SNR 214 and SNA 216.

After the S-CSCF 116 has provided the slice identifier 112 associated with the UE 102 to the P-CSCF 114 and/or one or more application servers 118 during the IMS registration process as shown in FIG. 5, the P-CSCF 114, the S-CSCF 116, and/or the application servers 118 can at later points in time use the slice identifier 112 to determine the network slice that the UE 102 is using to access services via the IMS 106. For example, the P-CSCF 114, the S-CSCF 116, and/or the application servers 118 can insert the slice identifier 112 associated with the UE 102 into SIP messages exchanged within the IMS 106 to identify and track which network slice is associated with corresponding IMS services and operations.

Figure 6:
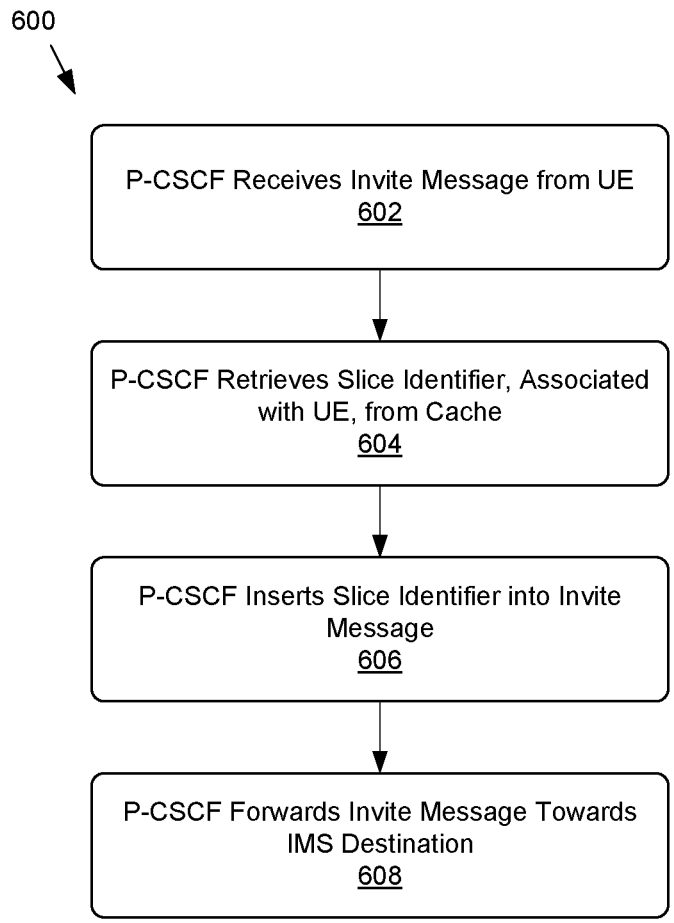
FIG. 6 shows a flowchart of an example method by which the P-CSCF can, following the IMS registration process for the UE, insert the slice identifier associated with the UE into a message associated with the UE.

FIG. 6 shows a flowchart of an example method 600 by which the P-CSCF 114 can, following the IMS registration process for the UE 102, insert the slice identifier 112 associated with the UE 102 into a message associated with the UE 102. At block 602, the P-CSCF 114 can receive the invite message 302 from the UE 102. The invite message 302 can, for example, be a SIP INVITE message that requests initiation of a call or other type of service or operation via the IMS 106.

At block 604, the P-CSCF 114 can retrieve the slice identifier 112 associated with the UE 102 from a cache maintained by the P-CSCF 114. The P-CSCF 114 can have previously received and cached the slice identifier 112 associated with the UE 102, for example from the S-CSCF 116 during the IMS registration process, as discussed above with respect to FIG. 5. Accordingly, the P-CSCF 114 can use an identifier of the UE 102 included in the invite message 302, such as an MSISDN, IMSI, or other identifier, to retrieve the slice identifier 112 that is associated with the UE 102 from the cache.

At block 606, the P-CSCF 114 can insert the slice identifier 112, retrieved from the cache at block 604, into the invite message 302. For example, the P-CSCF 114 can insert the slice identifier 112 into a "service-info" field, custom field, or other field of XML data of the invite message 302, or can insert the slice identifier 112 into any other field or data element of the invite message 302.

At block 608, the P-CSCF 114 can forward the invite message 302, now including the slice identifier 112 associated with the UE 102, towards one or more destinations within the IMS 106. For example, the P-CSCF 114 can forward the invite message 302 to the S-CSCF 116 associated with the UE 102, and the S-CSCF 116 can forward the invite message 302 to an application server 118 that is associated with the UE 102 and a type of service or operations requested in the invite message 302. Accordingly, the S-CSCF 116 and/or the application server 118 can determine, based on the slice identifier 112 inserted into the invite message 302 by the P-CSCF 114 at block 606, which network slice the UE 102 is using. In some examples, the S-CSCF 116 and/or the application server 118 can compare the slice identifier 112 inserted into the invite message 302 against a slice identifier previously cached by the S-CSCF 116 and/or the application server 118 for the UE 102.

Figure 7:
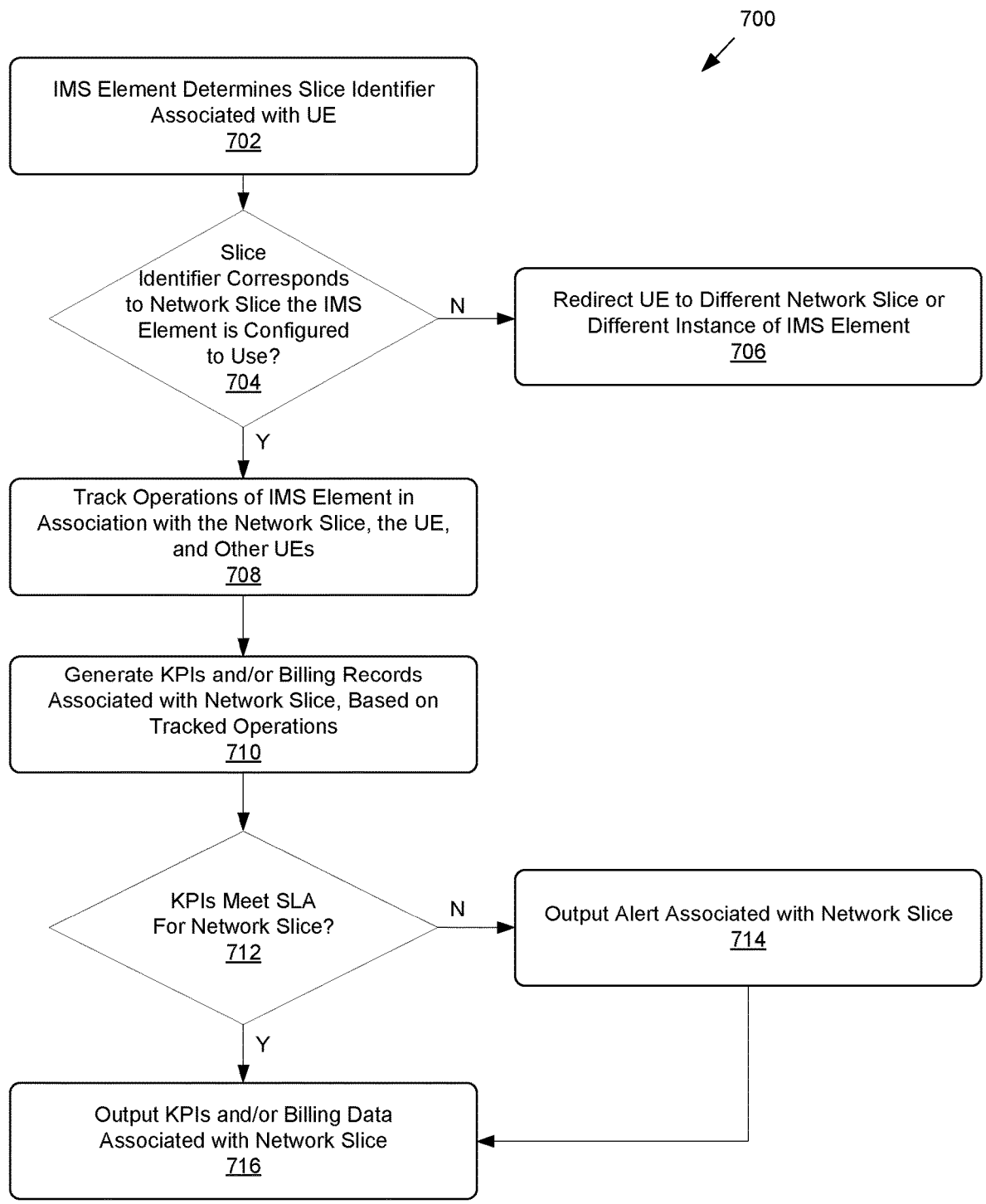
FIG. 7 shows a flowchart of an example method by which an IMS element can determine KPIs and/or billing data associated with a network slice based on usage of the network slice by one or more UEs.

FIG. 7 shows a flowchart of an example method 700 by which an IMS element can determine KPIs and/or billing data associated with a network slice based on usage of the network slice by one or more UEs. The IMS element can be the P-CSCF 114, the S-CSCF 116, or an application server 118.

At block 702, the IMS element can determine the slice identifier 112 associated with the UE 102. In some examples, the IMS element can determine the slice identifier 112 associated with the UE 102 during an IMS registration process, as discussed above with respect to FIG. 2 and FIG. 5. In other examples, the IMS element can determine the slice identifier 112 associated with the UE 102 after an IMS registration process, for instance based on a previously-cached instance of the slice identifier 112 for the UE 102 and/or based on the P-CSCF 114 or another IMS element inserting the slice identifier 112 into a message being sent through the IMS 106.

At block 704, the IMS element can determine whether the slice identifier 112 associated with the UE 102 corresponds with a network slice that the IMS element is configured to use to provide services to the UE 102. For example, if the IMS element has been reserved for use with one or more particular network slices, the IMS element can determine whether the slice identifier 112 associated with the UE 102 corresponds with one of those network slices. As another example, if an invite message or other type of message is requesting a particular type of service that can be provided by the IMS element, but the IMS element has been configured to perform that particular type of service in association with one or more particular network slices or types of network slices, the IMS element can determine whether the slice identifier 112 associated with the UE 102 corresponds with one of those network slices or types of network slices.

If the IMS element determines that the slice identifier 112 associated with the UE 102 does not correspond with a network slice that the IMS element is configured to use to provide services to the UE 102 (Block 704—No), the IMS element can at block 706 cause the UE 102 to be redirected to one of those network slices, or to a different instance of the IMS element that is configured to perform services in association with the network slice that corresponds to the slice identifier 112 associated with the UE 102. For example, if the IMS element has been reserved for use with one or more particular network slices or types of network slices, the IMS element may initiate a re-registration process for the UE 102, such that the UE 102 is re-registered with the core network 104 and/or the IMS 106 and becomes associated with one of the particular network slices or types of network slices for which the IMS element is reserved. As another example, such a re-registration process may cause the UE 102 to be re-assigned in the IMS 106 to a different instance of the IMS element that is associated with the network slice that the UE 102 is already using.

If the IMS element instead determines that the slice identifier 112 associated with the UE 102 does correspond with a network slice that the IMS element is configured to use to provide services to the UE 102 (Block 704—Yes), the IMS element can begin performing operations associated with such services. At block 708, the IMS element can track such operations in association with the UE 102 and with the network slice that corresponds with the slice identifier 112. The IMS element can also track the same or similar operations in association with other UEs that are also associated with the same the slice identifier 112 at block 708, as those other UEs can also be associated with the same network slice as the UE 102.

Accordingly, at block 710 the IMS element can generate KPIs, billing data, and/or other types of information associated with the network slice, based on tracking operations performed for the UE 102 and other UEs in association with the network slice at block 708. For example, the IMS element can generate KPIs indicating how often the network slice is being used by UEs to engage in one or more types of communication sessions or IMS services, which types of communication sessions or IMS services are being used by UEs via the network slice, total numbers of instances of communication sessions or IMS services that UEs are engaging in via the network slice over periods of time, how usage of the network slice in association with the IMS compares to a total capacity of the network slice, latency metrics associated with communication sessions or IMS services that UEs are engaging in via the network slice, throughput metrics associated with communication sessions or IMS services that UEs are engaging in via the network slice, and/or other types of KPIs. As another example, the IMS element can generate billing data based on the KPIs or other metrics that indicate how UEs are using the network slice to engage in communication sessions or IMS services.

At block 712, the IMS element can determine whether one or more of the KPIs determined at block 710 in association with the network slice meet corresponding goals defined in an SLA for the network slice. If the IMS element determines that the KPIs associated with the network slice are not meeting the corresponding goals defined in the SLA, the IMS element may output an alert or other notification associated with the network slice at block 714. The IMS element can, for example, send the alert to another IMS element, to an owner or operator of the IMS 106, to an element of the core network 104, and/or to any other destination.

At block 714, the IMS element can also output the KPIs and/or billing data associated with the network slice generated at block 710. For example, the IMS element can output the KPIs and/or billing data associated with the network slice alert to another IMS element, to an owner or operator of the IMS 106, to an element of the core network 104, and/or to any other destination.

Although FIG. 7 shows a single IMS element generating KPIs and/or billing data associated with a network slice, and/or comparing the KPIs against goals defined in an SLA for the network slice, in other examples multiple IMS elements can send tracked data about operations performed by those IMS elements to a central server or other network element. The central server or other network element can aggregate the data to determine KPIs and/or billing data associated with the network slice as discussed with respect to block 710, based on operations performed by multiple IMS elements. The central server or other network element can also compare the KPIs against SLA goals as discussed with respect to block 712, and/or output corresponding alerts, KPI data, and/or billing data as discussed with respect to block 714 and block 716.

The operations of FIG. 7 can also be performed by one or more IMS elements in association with multiple network slices. For example, if the IMS element is configured to perform services for UEs in association with multiple network slices, the IMS element can use the method 700 shown in FIG. 7 to separate track operations associated with different network slices, to determine different KPIs and/or different billing data in association with different network slices, and/or to output corresponding alerts, KPI data, and/or billing data in association with different network slices.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   receiving, by a Serving Call Session Control Function (S-CSCF) of an Internet Protocol (IP) Multimedia Subsystem (IMS), a registration message associated with a user equipment (UE) from a Proxy Call Session Control Function (P-CSCF) of the IMS;
   retrieving, by the S-CSCF in response to receiving the registration message, a slice identifier associated with the UE from a Home Subscriber Server (HSS), wherein the slice identifier:
      corresponds to a network slice associated with the UE, and
      is used within a core network to identify the network slice;
   sending, by the S-CSCF, the slice identifier associated with the UE to the P-CSCF in a registration response message; and
   sending, by the S-CSCF, the slice identifier associated with the UE to an application server of the IMS.

2. The method of claim 1, wherein retrieving the slice identifier associated with the UE comprises:
   sending, by the S-CSCF, a Server Assignment Request (SAR) to the HSS; and
   receiving, by the S-CSCF, a Server Assignment Answer (SAA) from the HSS, wherein the SAA includes the slice identifier associated with the UE.

3. The method of claim 2, wherein the SAA includes the slice identifier associated with the UE in a service-info field of Extensible Markup Language (XML) data.

4. The method of claim 1, further comprising verifying, by the application server, the slice identifier associated with the UE by:
   sending, by the application server, a Subscribe Notifications Request (SNR) to the HSS; and
   receiving, by the application server, a Subscribe Notifications Answer (SNA) from the HSS, wherein the SNA includes the slice identifier associated with the UE.

5. The method of claim 1, further comprising:
   storing, by the P-CSCF, the slice identifier associated with the UE in a cache of the P-CSCF, in association with an identifier of the UE;
   receiving, by the P-CSCF, an invite message from the UE;
   retrieving, by the P-CSCF, the slice identifier associated with the UE from the cache;
   inserting, by the P-CSCF, the slice identifier associated with the UE into the invite message; and
   forwarding, by the P-CSCF, the invite message to the S-CSCF, wherein the invite message includes the slice identifier associated with the UE.

6. The method of claim 5, further comprising forwarding, by the S-CSCF, the invite message to the application server of the IMS, wherein the invite message includes the slice identifier associated with the UE.

7. The method of claim 6, further comprising
   verifying, by at least one of the S-CSCF, the P-CSCF, or the application server, that the at least one of the S-CSCF, the P-CSCF, or the application server is configured to perform operations for the UE in association with the network slice that corresponds to the slice identifier.

8. The method of claim 1, further comprising
   identifying, by at least one of the S-CSCF, the P-CSCF, or the application server of the IMS, operations performed by the at least one of the S-CSCF, the P-CSCF, or the application server in association with the network slice, based on one or more messages associated with the UE or one or more other UEs that include the slice identifier, and
   generating, by the at least one of the S-CSCF, the P-CSCF, or the application server, at least one of a key performance indicator (KPI) or a billing record associated with usage of the network slice.

9. The method of claim 1, wherein:
   the HSS was provisioned with the slice identifier associated with the UE by a subscriber provisioning platform, and
   the subscriber provisioning platform also provisioned the slice identifier associated with the UE to a Unified Data Management (UDM) function in the core network.

10. The method of claim 9, wherein the subscriber provisioning platform provisioned the slice identifier associated with the UE to the HSS in a service-info field of Extensible Markup Language (XML) data.

11. A system, comprising:
   a Home Subscriber Server (HSS) that stores, based on being provisioned with user data by a subscriber provisioning platform, a slice identifier associated with a user equipment (UE), wherein the slice identifier:
      corresponds to a network slice associated with the UE, and
      is used within a core network to identify the network slice; and a Proxy Call Session Control Function (P-CSCF) of an Internet Protocol (IP) Multimedia Subsystem (IMS);
an application server of the IMS; and
a Serving Call Session Control Function (S-CSCF) of the IMS, wherein the S-CSCF is configured to:
retrieve the slice identifier associated with the UE from the HSS in response to receiving a registration message associated with the UE from the P-CSCF; and
send the slice identifier associated with the UE to the P-CSCF in a registration response message,
wherein the P-CSCF is configured to:
based on receiving the registration response message, store the slice identifier associated with the UE in a cache, in association with an identifier of the UE;
insert the slice identifier associated with the UE into an invite message received from the UE; and
forward the invite message, including the slice identifier associated with the UE, towards at least one of the S-CSCF or the application server,
wherein the S-CSCF is further configured to, in response to retrieving the slice identifier associated with the UE from the HSS, send the slice identifier associated with the UE to the application server.

12. The system of claim 11, wherein the application server is configured to:
send a Subscribe Notifications Request (SNR) associated with the UE to the HSS; and
receive a Subscribe Notifications Answer (SNA) from the HSS, wherein the SNA includes the slice identifier associated with the UE.

13. The system of claim 11, wherein at least one of the S-CSCF, the P-CSCF, or the application server is configured to verify that the at least one of the S-CSCF, the P-CSCF, or the application server is configured to perform operations for the UE in association with the network slice that corresponds to the slice identifier.

14. The system of claim 11, wherein at least one of the S-CSCF, the P-CSCF, or the application server is configured to:
identify operations performed by the at least one of the S-CSCF, the P-CSCF, or the application server in association with the network slice, based on one or more messages associated with the UE or one or more other UEs that include the slice identifier, and
generate at least one of a key performance indicator (KPI) or a billing record associated with usage of the network slice.

15. One or more non-transitory computer-readable media storing computer-executable instructions associated with a Serving Call Session Control Function (S-CSCF) of an Internet Protocol (IP) Multimedia Subsystem (IMS) that, when executed by one or more processors associated with the S-CSCF, cause the one or more processors to:
receive a registration message associated with a user equipment (UE) from a Proxy Call Session Control Function (P-CSCF) of the IMS;
retrieve, in response to receiving the registration message, a slice identifier associated with the UE from a Home Subscriber Server (HSS), wherein the slice identifier
corresponds to a network slice associated with the UE, and
is used within a core network to identify the network slice; and
send the slice identifier associated with the UE to the P-CSCF in a registration response message,
wherein the HSS was provisioned with the slice identifier associated with the UE by a subscriber provisioning platform, and
wherein the subscriber provisioning platform also provisioned the slice identifier associated with the UE to a Unified Data Management (UDM) function in the core network.

16. The one or more non-transitory computer-readable media of claim 15, wherein the computer-executable instructions further cause the one or more processors to send the slice identifier associated with the UE to an application server of the IMS.

17. The one or more non-transitory computer-readable media of claim 15, wherein the computer-executable instructions further cause the one or more processors to:
receive, from the P-CSCF, an invite message associated with the UE, wherein the invite message includes a copy of the slice identifier associated with the UE that the P-CSCF inserted into the invite message; and
forward the invite message, including the copy of the slice identifier associated with the UE, to an application server of the IMS.

* * * * *